(12) United States Patent
Hughes

(10) Patent No.: US 12,390,047 B2
(45) Date of Patent: Aug. 19, 2025

(54) DRAIN DA FAT

(71) Applicant: Ewart Fitzmore Hughes, Massapequa, NY (US)

(72) Inventor: Ewart Fitzmore Hughes, Massapequa, NY (US)

(*) Notice: Subject to any disclaimer, the term of this patent is extended or adjusted under 35 U.S.C. 154(b) by 295 days.

(21) Appl. No.: 17/566,671

(22) Filed: Dec. 30, 2021

(65) Prior Publication Data

US 2022/0386812 A1 Dec. 8, 2022

Related U.S. Application Data

(60) Provisional application No. 63/205,613, filed on Dec. 30, 2020.

(51) Int. Cl.
*A47J 37/07* (2006.01)

(52) U.S. Cl.
CPC .................................. *A47J 37/0786* (2013.01)

(58) Field of Classification Search
CPC ................ A47J 37/0786; A47J 37/1295; A47J 37/1271; A47J 37/12; F24C 15/16
See application file for complete search history.

(56) References Cited

U.S. PATENT DOCUMENTS

| | | | |
|---|---|---|---|
| 9,155,422 B1* | 10/2015 | Wohld | A47J 43/18 |
| 10,598,383 B1* | 3/2020 | Schoettle | A47J 37/0786 |
| 10,709,293 B1* | 7/2020 | Nathans | C08J 11/14 |
| 2012/0055346 A1* | 3/2012 | Navare | A47J 37/10 99/446 |
| 2013/0233183 A1* | 9/2013 | Brinckerhoff | A47J 37/1295 99/403 |
| 2017/0143161 A1* | 5/2017 | Masterson | A47J 36/26 |
| 2017/0258271 A1* | 9/2017 | Man | A47J 37/1223 |
| 2019/0069723 A1* | 3/2019 | McClellan | A23L 5/11 |
| 2020/0260911 A1* | 8/2020 | Brennan | A47J 36/16 |
| 2021/0007552 A1* | 1/2021 | Tanaka | A47J 37/1276 |
| 2021/0022552 A1* | 1/2021 | Porraro | A47J 37/0786 |
| 2021/0338010 A1* | 11/2021 | Hamel | A47J 37/0786 |

* cited by examiner

*Primary Examiner* — Ko-Wei Lin

(57) ABSTRACT

Described herein are examples of an apparatus which includes a metal frame and metal grill. The metal frame has a handle, an upper ring and an lower ring, and the frame is fitted over the perimeter of a pan while the metal grill is lowered below the perimeter of the pan and held in place above the cooking oil by a support.

7 Claims, 3 Drawing Sheets

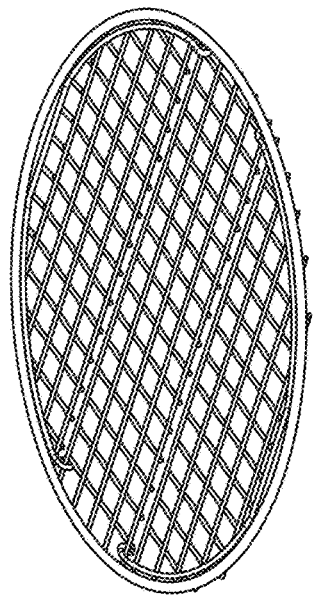
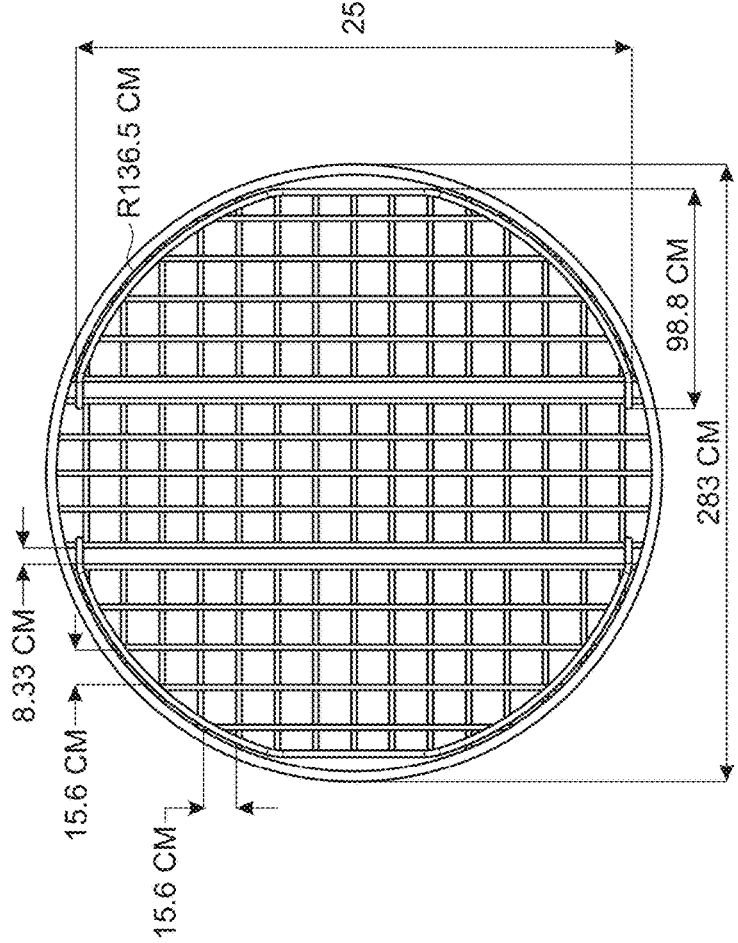
FIG. 2B
FIG. 2A

DRAIN DA FAT

CROSS REFERENCE TO RELATED APPLICATIONS

This application claims the benefit of U.S. non provisional patent application Ser. No. 17/566,671 filed Dec. 30, 2021.

FIELD OF THE INVENTION

The present Inventory relates to the field of health and in particular diet and nutrition as its applied to reduction in the consumption of excess grease associated with deep fried foods.

BACKGROUND TO THE INVENTION

Among many studies with similar conclusions, a study by Harvard University School of Public Health found that people who eat a lot of fried foods may have a higher risk of developing heart disease and type 2 diabetes. The findings were based on data examining 100000 men and women over a 25-year period. Before the pandemic, heart disease was the leading cause of death in the US. This is not suggesting that all those heart disease deaths were tied to consumption of fried foods, but it has been a factor according to research.

Deep fried foods are still very popular among millions of people in the US. This Innovation seeks to limit the intake of excess grease associated with fried foods and type 2 diabetes and cardiovascular diseases and as a result promote longevity and well been.

The devise comprises a metal frame and a drip tray or grill. The frame has a handle and is fitted over the perimeter of a boiling pan of deep fried food while the inner grill is submerged below the perimeter but help in place above the oil by a support that is a part of the frame. The grill has 2 flaps or opening so the non-fried foods can be placed into the boiling oil while fried ones are removed and placed on the dripping tray.

Presently most people might use a separate cooling rack to drip oil but this leaves the food cold, or they might use napkins to remove excess oil but this makes the food soggy.

BRIEF SUMMARY OF THE INVENTION

It is the object of the present invention to provide a device that can help to drain excess oil from fried food while keeping them warm and crispy. This is so because the dripping tray is suspended above the oil in the pan.

It is the object of the present invention to avoid the inconvenience of using a separate drain rack that is not immediately over the heat thus causing the food to get cold and less crispy or to avoid having to use napkins inside a plate to sap up excess grease since this causes the food to reabsorb the grease and becoming soggy. This invention helps to keep the fried foods crispy and less soggy. It also voids the need for additional counter space.

It is another object of the present invention to be able to access fried foods for stirring or removal without having to remove the drip rack that is suspended above the cooking oil. This is possible since the grill has two flaps or opening on opposite ends that can rotate to allow removal and immersion. This is also possible since the grill is not welded onto the support but rest on it so it can slide around to any desired position for access.

It is the object of the invention to provide an apparatus that is versatile and convenient. The metal frame of the invention hangs over the perimeter of the pan and has a handle that allows it to be placed or remove effortlessly. Similarly, the inner grill can be placed and removed effortlessly and allows easily sliding it around on the support from the frame.

BRIEF DESCRIPTION OF THE DRAWINGS

FIG. 2a is a top view square pattern inner grill.
FIG. 2b is a ¾ view of the square pattern inner grill.

DETAILED SPECIFICATIONS

Figure 1:
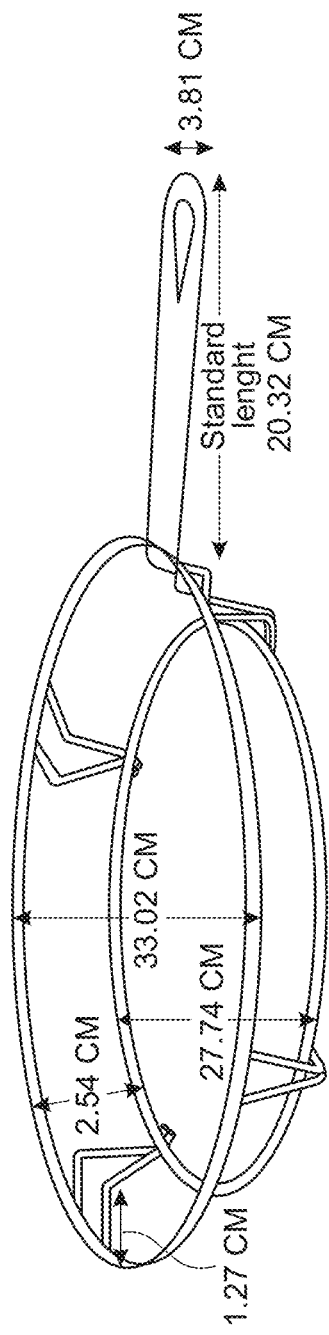
FIG. 1 is a ¾ view of the he metal frame.
Figure 2:
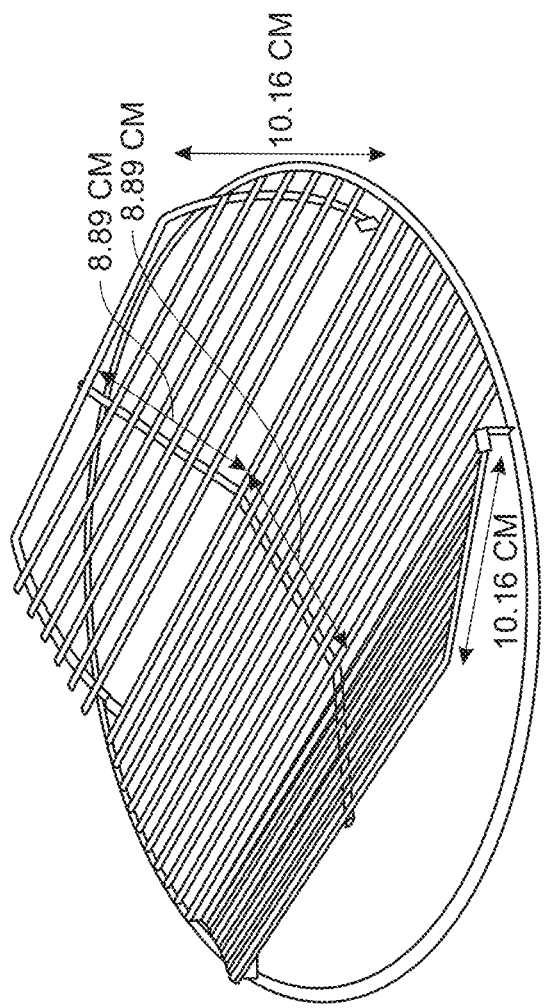
FIG. 2 is a ¾ view of the inner grill.
Figure 2D:
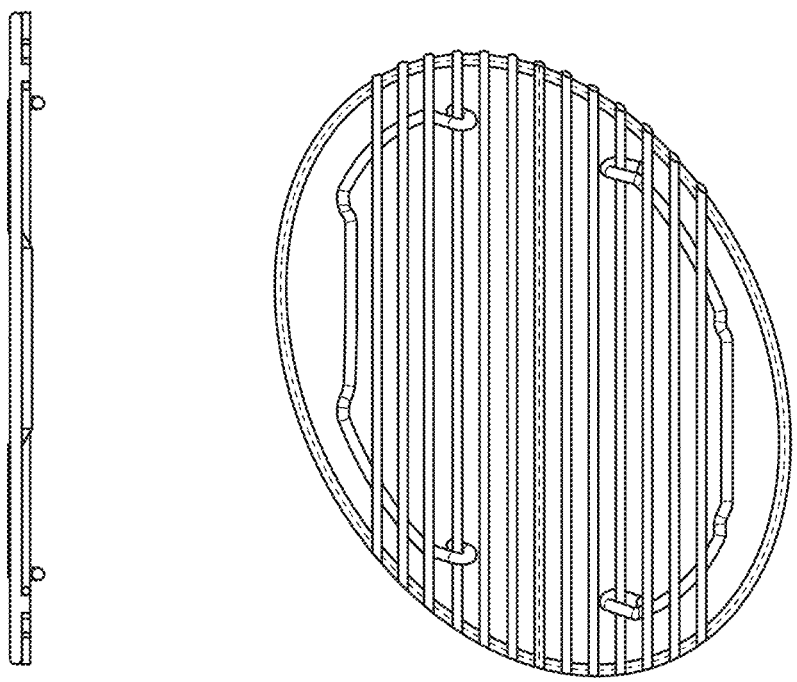
FIG. 2d is a ¾ view of line pattern grill.
Figure 2C:
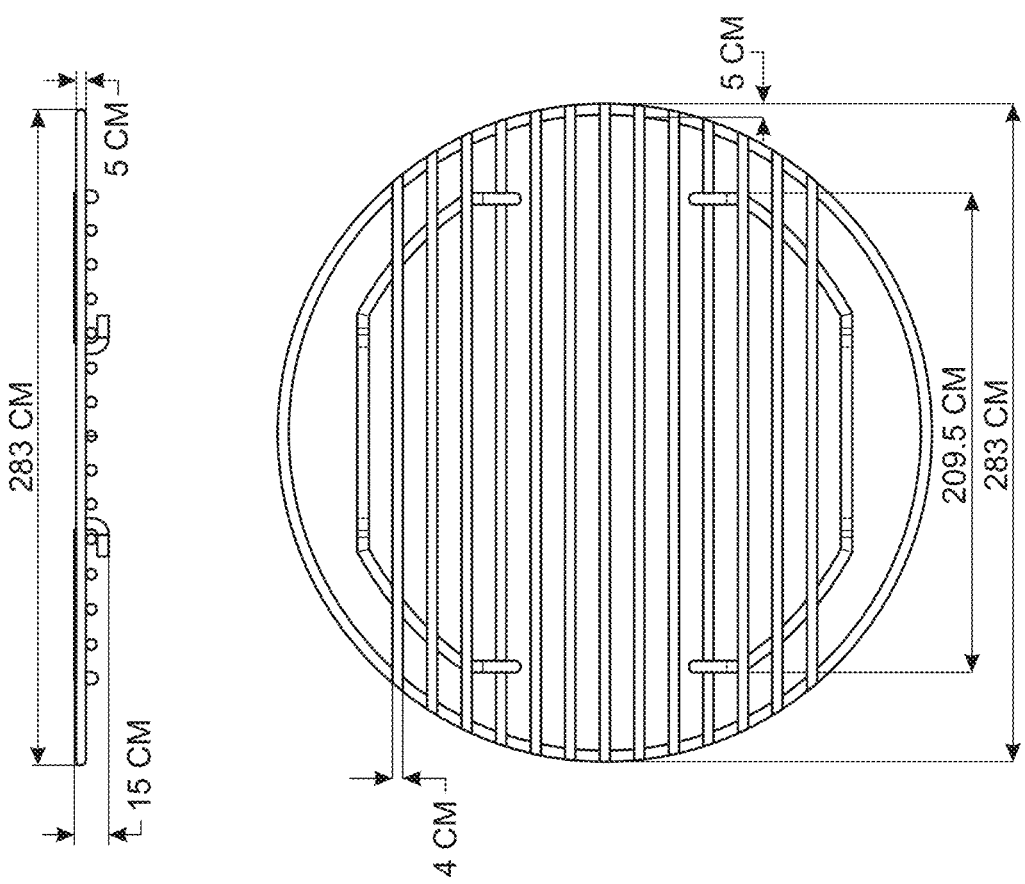
FIG. 2c is a top view of the line pattern inner grill.

The outer frame has a handle that is 3.81 cm at its widest point and is 20.32 cm in length.

For smaller pans the upper ring is 27.94 and the lower ring is 22.86 cm 27.94 cm for smaller pans. The v shaped metal support connecting both upper and lower rings, starts from the lower ring then goes in a 1.27 cm horizontal direction then rises 2.54 cm and then 1.27 cm right angle where its attached to the upper ring.
The Inner Grill The second part is the inner grill that is circular in shape and fits inside the outer frame. It is 26.16 cm in diameter and sits on the lower ring which is a part of the outer frame. This circular grill is comprised of 3 parts, a center piece and two rotating ends on either side of the center piece. These sizes vary depending on the amount of space needed to insert remove and drip deep fried foods.

The opening Flaps are usually 25.5 cm wide and 9.88 cm deep but can be 10.73 cm in some to provide a larger opening for easier handling of fried foods. The grill has a square pattern or straight line. For the squares pattern each square is 8.33 cm wide. The rotating ends are attached to the inner piece by a hooked rod that acts as the hinges. The outer sides rotate up or down.
The Outer Frame The Outer frame has an upper ring that is 13 inches in diameter. This ring is attached to a lower ring that is 10 inches in diameter, and are held together by 4 v shaped posts that rise 1 inch from the bottom ring to the height of the top but extends 0.5 inches at a 90 degrees angle.

The outer frame has a handle that is 1.5 inches at its widest point and is 8 inches in length.
The Inner Grill The second part is the inner grill that is circular in shape and fits inside the outer frame. It is 10.3 inches in diameter and sits on the lower ring which is a part of the outer frame. This circular grill is comprised of 3 parts, a center piece and two rotating ends on either side of the center piece. Each piece is 3.33 inches in width. The rotating ends are attached to the inner piece by a hooked rod that acts as the hinges. The outer sides rotate up or down.

What is claimed is:
1. An apparatus comprising a metal frame,
  wherein the metal frame is configured to support a grill and be suspended over a pan comprising cooking oil, the metal frame further comprising:
    a handle,
    an upper ring,
      wherein the handle extends horizontally distal from the upper ring,
    a lower ring, and a metal grill,
  wherein the handle is connected to the upper ring and the lower ring,
  wherein the upper ring comprises a diameter configured to the pan,
  wherein a diameter of the lower ring is less than the diameter of the upper ring,
  wherein the upper ring is configured to be supported by a perimeter of the pan via a support that connects the lower ring to the upper ring,
  wherein the support extends inward horizontally from said upper ring, bends at a 90-degree angle downward, extends vertically downward towards the lower ring, and then bends at an angle inwards and extends horizontally to connect to the lower ring,
  wherein the support:
    attaches to the lower ring approximately one inch below the upper ring,
    wherein the lower ring has a diameter approximately three inches less than the diameter of the upper ring, and
    wherein the support has a v shape, wherein a base of the v shaped support is attached to the lower ring and a top of the v shaped support is attached at two points to the upper ring,
  wherein the lower ring is configured to support the metal grill,
  wherein the metal grill further comprises two rotating ends on opposite sides of the metal grill,
  wherein the metal grill is not attached to the metal frame,
  wherein the metal grill is configured to allow cooked food to drip oil into the cooking oil while the metal frame rests on the pan, and
  wherein the two rotating ends are configured to open and allow a user to place food from the cooking oil onto the metal grill.

2. The apparatus of claim 1, comprising three additional v shaped supports.

3. The apparatus of claim 1, wherein the metal grill comprises straight line grates.

4. The apparatus of claim 1, wherein the handle is approximately eight inches in length.

5. The apparatus of claim 1, wherein the metal grill comprises:
  a center piece, and
    wherein the rotating ends are configured to fold onto the center piece to allow food to be removed from the cooking oil and placed on the metal grill.

6. The apparatus of claim 1, wherein the rotating ends are attached to the center piece via hinges comprising hooked rods.

7. An apparatus comprising a metal frame,
  wherein the metal frame is configured to support a grill and be suspended over a pan comprising cooking oil, the metal frame further comprising:
  a handle,
  an upper ring,
    wherein the handle extends horizontally distal from the upper ring,
  a lower ring, and
  a metal grill,
    wherein the handle is connected to the upper ring and the lower ring,
    wherein the upper ring comprises a diameter configured to the pan,
    wherein a diameter of the lower ring is less than the diameter of the upper ring,
    wherein the upper ring is configured to be supported by a perimeter of the pan via a support that connects the lower ring to the upper ring,
    wherein the support extends inward horizontally from said upper ring, bends downward, extends vertically downward towards the lower ring, and then bends inwards and extends horizontally to connect to the lower ring,
    wherein the support:
      attaches to the lower ring approximately one inch below the upper ring,
      wherein the lower ring has a diameter approximately three inches less than the diameter of the upper ring, and
      wherein the support has a v shape, wherein a base of the v shaped support is attached to the lower ring and a top of the v shaped support is attached at two points to the upper ring,
    wherein the lower ring is configured to support the metal grill,
    wherein the metal grill further comprises two rotating ends on opposite sides of the metal grill,
    wherein the metal grill is not attached to the metal frame,
    wherein the metal grill is configured to allow cooked food to drip oil into the cooking oil while the metal frame rests on the pan, and
    wherein the two rotating ends are configured to open and allow a user to place food from the cooking oil onto the metal grill.

* * * * *